United States Patent
Appleby et al.

(10) Patent No.: US 8,125,901 B2
(45) Date of Patent: Feb. 28, 2012

(54) VIDEO STREAMING

(75) Inventors: Stephen C Appleby, Colchester (GB);
Patrick J Mulroy, Ipswich (GB)

(73) Assignee: British Telecommunications public limited company, London (GB)

( * ) Notice: Subject to any disclaimer, the term of this patent is extended or adjusted under 35 U.S.C. 154(b) by 324 days.

(21) Appl. No.: 12/594,280

(22) PCT Filed: Mar. 27, 2008

(86) PCT No.: PCT/GB2008/001069
§ 371 (c)(1),
(2), (4) Date: Oct. 1, 2009

(87) PCT Pub. No.: WO2008/119954
PCT Pub. Date: Oct. 9, 2008

(65) Prior Publication Data
US 2010/0128604 A1 May 27, 2010

(30) Foreign Application Priority Data

Apr. 2, 2007 (GB) .................................. 0706424.9

(51) Int. Cl.
*H04L 12/26* (2006.01)
(52) U.S. Cl. ....................................................... 370/230
(58) Field of Classification Search .......... 370/229–335, 370/395.5–395.52, 464–465
See application file for complete search history.

(56) References Cited

U.S. PATENT DOCUMENTS

| | | | |
|---|---|---|---|
| 2005/0021830 | A1* | 1/2005 | Urzaiz et al. .................. 709/234 |
| 2006/0120290 | A1 | 6/2006 | Della Torre et al. |
| 2007/0009045 | A1 | 1/2007 | Mohandas |

FOREIGN PATENT DOCUMENTS

| | | |
|---|---|---|
| EP | 1 296 479 | 3/2003 |
| EP | 1 296 479 A1 | 3/2003 |
| WO | 03/084172 A1 | 10/2003 |
| WO | WO 03/084172 | 10/2003 |

OTHER PUBLICATIONS

International Search Report for PCT/GB2008/001069 mailed Nov. 4, 2008.

(Continued)

*Primary Examiner* — Frank Duong
(74) *Attorney, Agent, or Firm* — Nixon & Vanderhye P.C.

(57) ABSTRACT

The bitrate for any practical video streaming system will vary considerably as a function of the difficulty of encoding the sequence in question. This variation is even more apparent when comparing different video clips of different genres for example where sports clips might require a higher average bitrate and fluctuate more due to the high activity of typical scenes, whereas a news report clip might require a much lower bitrate and be relatively static. As such, to deliver video streams at a constant quality to users sharing a contended network, a constant bandwidth method is not efficient to use across all the streams. The bandwidth allocated to each stream must be allowed to dynamically vary in time in accordance with the precise demands of the video being streamed at that time and also be within any network bandwidth constraints. The present invention defines such a method.

8 Claims, 3 Drawing Sheets

OTHER PUBLICATIONS

Written Opinion for PCT/GB2008/001069 mailed Nov. 4, 2008.

UK Search Report dated Aug. 9, 2007 in GB0706424.9.

"Analysis of a Bandwidth Allocation Strategy for Proportional Streaming Services," E-Commerce Technology, 2004, CEC 2004, Proceedings, IEEE International Conference in San Diego, CA, USA Jul. 6-9, 2004, Piscataway, NJ, USA, Zhou & Xu, pp. 373-376, ISBN 0-7695-2098-7, XP010714145.

Balakrishnan, H., Devadas, S., Ehlert, D. and Arvind, "Rate Guarantees and Overload Protection in Input Queued Switches," INFOCOM 2004, Twenty-third AnnualJoint Conference of the IEEE Computer and Communications Societies Hong Kong, PR China Mar. 7-11, 2004, Piscataway, NJ, USA, INFOCOM 2004, Twenty-third AnnualJoint Conference of the IEEE, pp. 2185-2195, vol. 4, ISBN 0-7803-8355-9, XP010740588.

* cited by examiner

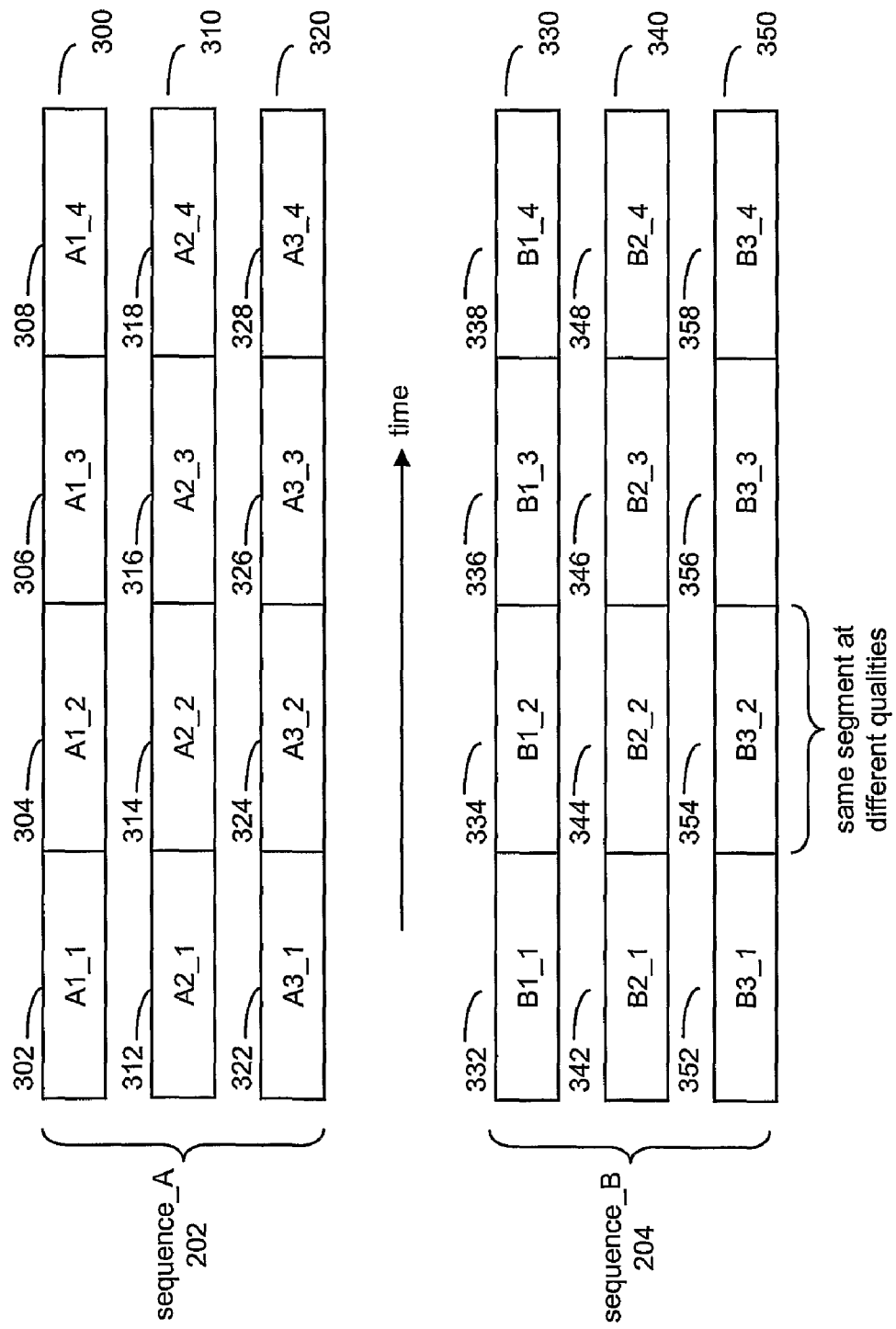

VIDEO STREAMING

This application is the U.S. national phase of International Application No. PCT/GB2008/001069 filed 27 Mar. 2008 which designated the U.S. and claims priority to British Patent Application No. 0706424.9 filed 2 Apr. 2007, the entire contents of each of which are hereby incorporated by reference.

FIELD OF THE INVENTION

The present invention relates to the transmission of video signals over telecommunications networks, and more particularly with a method for controlling the transmission of multiple video streams over a congested network so that each stream receives an equitable share of the bandwidth dependent on the quality of the encoding.

BACKGROUND TO THE INVENTION

Transmission of video over data networks, such as the Internet, is commonplace today. To receive such signals, a user can use a suitably configured computer or other receiver such as a "set top box" (STB). STBs have become increasingly popular and many are provided with IP connection allowing content such as video to be streamed or downloaded over the Internet. Television delivered over the Internet, commonly referred to as IPTV, is a good example of this growing service.

When streaming video data over an IP network, there are no guarantees that the data sent will reach its destination. When the network experiences congestion and other problems, delays will occur to the transmission of the data packets and some packets may even be lost.

To provide more reliable end-to-end delivery of data, the transmission control protocol (TCP) is often used as the transport protocol. Indeed, it is quite common to use TCP in video streaming systems for a number of reasons, but primarily because TCP provides mechanisms for ensuring reliable delivery, and managing network congestion. For example, one way in which TCP achieves reliability is by obliging the receiver to acknowledge to the sender any data received. If a packet of data remains unacknowledged after a predetermined period of time, TCP assumes the packet was not received and the same packet is retransmitted by the sender. One way that TCP manages congestion is by reducing the transmission rate of data as a function of congestion in the network.

Take the scenario where a number of video streams are being delivered using TCP and all share a contended piece of network. When congestion occurs, the TCP congestion control algorithm will force all the streams to back off their delivery rate to allow the congestion to clear. Each stream backs off by a fixed factor and eventually all streams will stabilise at approximately the same bandwidth (assuming a similar round trip time). Use of such a method is not without problems as delays to segments of the video streams are particularly undesirable. This is can be mitigated at least in part using various techniques such as using receiver buffers and dropping occasional segments and relying on error recovery instead.

Video streams are also sometimes delivered at a variable bitrate over TCP. However, the above congestion scenario may still occur, and two streams each having a different bitrate will still stabilise to roughly the same reduced bitrate when the network is congested. This may result in some particularly undesirable results where a first stream is initially encoded at a high bitrate, for example a video sequence with high frame activity such as a sports sequence, and a second sequence is encoded at a low bit rate, for example a video sequence with a low frame activity such as a news or drama sequence.

When congestion is experienced in the network, TCP will cut the available bandwidth for both streams to roughly the same level. This will affect the first stream, which was encoded at a higher bitrate and thus has a higher bandwidth requirement, more than the second stream, which might was encoded at a lower bitrate and thus may still have enough bandwidth to stream its low bitrate stream. Put another way, the first, high bitrate, stream will be more significantly affected than the second, low bitrate stream, as the first stream is given the same reduced bandwidth as the second stream. This will cause the quality of the video delivered to each user to vary over time, and the quality to vary from user to user depending on the type of video clip they are viewing.

Another way of streaming video that mitigates some of these problems experienced under TCP is to use a constant bitrate delivery system where the bitrate available to a video stream is fixed, for example by a reservation scheme, before the transmission of data starts. This method of delivery is easier to manage, but is not without its problems.

Again, taking the example of the two video streams above, where we have a first stream that has very active frames such as a sports clip, and a second stream with less active frames such as a news clip. The bitrate reserved and used to deliver the two streams are fixed at a predetermined rate (that is considered to be sufficient for most applications and in this case for both streams). However, the second stream will not actually require that much bandwidth as the bitrate of the encoding can be much lower than that of the first sequence given that the activity in the second sequence is much less. The second stream transmitted using this fixed bandwidth is thus wasting much of its bandwidth. If the second stream increases the encoding rate so as to utilise the entire bandwidth reserved, the quality of the resulting video is likely to be of a lot higher quality than the first stream. However, this increase in quality may not necessarily be significant as perceived by the viewer and may thus be wasted. Moreover, having this redundant bandwidth is not an efficient use of network resources.

The problems above are heightened when you start considering video sequences that vary in activity during the sequence itself. For example a relatively static news reading sequence might be interspersed with highlights of very active football clips.

SUMMARY OF THE INVENTION

It is the aim of embodiments of the present invention to address one or more of the above-stated problems.

According to a first aspect of the present invention, there is provided a method of controlling the transmission of video clips over a communications network, said method comprising the steps of:
i) transmitting over a communications network a first encoded video sequence corresponding to a first video clip and a second encoded video sequence corresponding to a second video clip, wherein the first encoded video sequence is encoded with a first bitrate and the second encoded video sequence is encoded with a second bitrate, and wherein the first and the second encoded video sequences are both encoded at a first quality level; and ii) controlling the bandwidth allocated to the first and the second encoded video sequences in the network, wherein a first bandwidth allocated to the first encoded video sequence is proportional to the bitrate of said first encoded video sequence, and a second bandwidth allocated to the second encoded video sequence is proportional to the bitrate of said second encoded video sequence.

Preferably, the method further comprises in response to the controlling step:

iii) changing the bitrates with which each of the first and the second encoded video sequences are encoded, wherein the first and the second encoded video sequences are both encoded at a second quality level; and iv) transmitting the first and the second encoded video sequences 25, from step iii) over the communications network.

The bandwidth may be controlled in response to congestion in the communications network. The network would typically be a packet based network, and particularly an IP network.

The network may employ a variation of the transmission control protocol, where the bandwidth allocated to each encoded video sequence may comprise adjusting the backoff parameter in the transmission control protocol.

The term encoding may refer to compression, and where the encoding technique may be MPEG-4 encoding.

According to a second aspect of the present invention, there is provided a system for controlling the transmission of video clips over a communications network, said system comprising:

i) a server adapted to transmit over a communications network a first encoded video sequence corresponding to a first video clip and a second encoded video sequence corresponding to a second video clip, wherein the first encoded video sequence is encoded with a first bitrate and the second encoded video sequence is encoded with a second bitrate, and wherein the first and the second encoded video sequences are both encoded at a first quality level; and ii) means for controlling the bandwidth allocated to the first and the second encoded video sequences in the network, wherein a first bandwidth allocated to the first encoded video sequence is proportional to the bitrate of said first encoded video sequence, and a second bandwidth allocated to the second encoded video sequence is proportional to the bitrate of said second encoded video sequence.

BRIEF DESCRIPTION OF THE DRAWINGS

For a better understanding of the present invention reference will now be made by way of example only to the accompanying drawings, in which:

FIG. 3 is a diagram showing two different video clips encoded with at three quality levels.

DESCRIPTION OF THE PREFERRED EMBODIMENTS

The present invention is described herein with reference to particular examples. The invention is not, however, limited to such examples.

Figure 1:
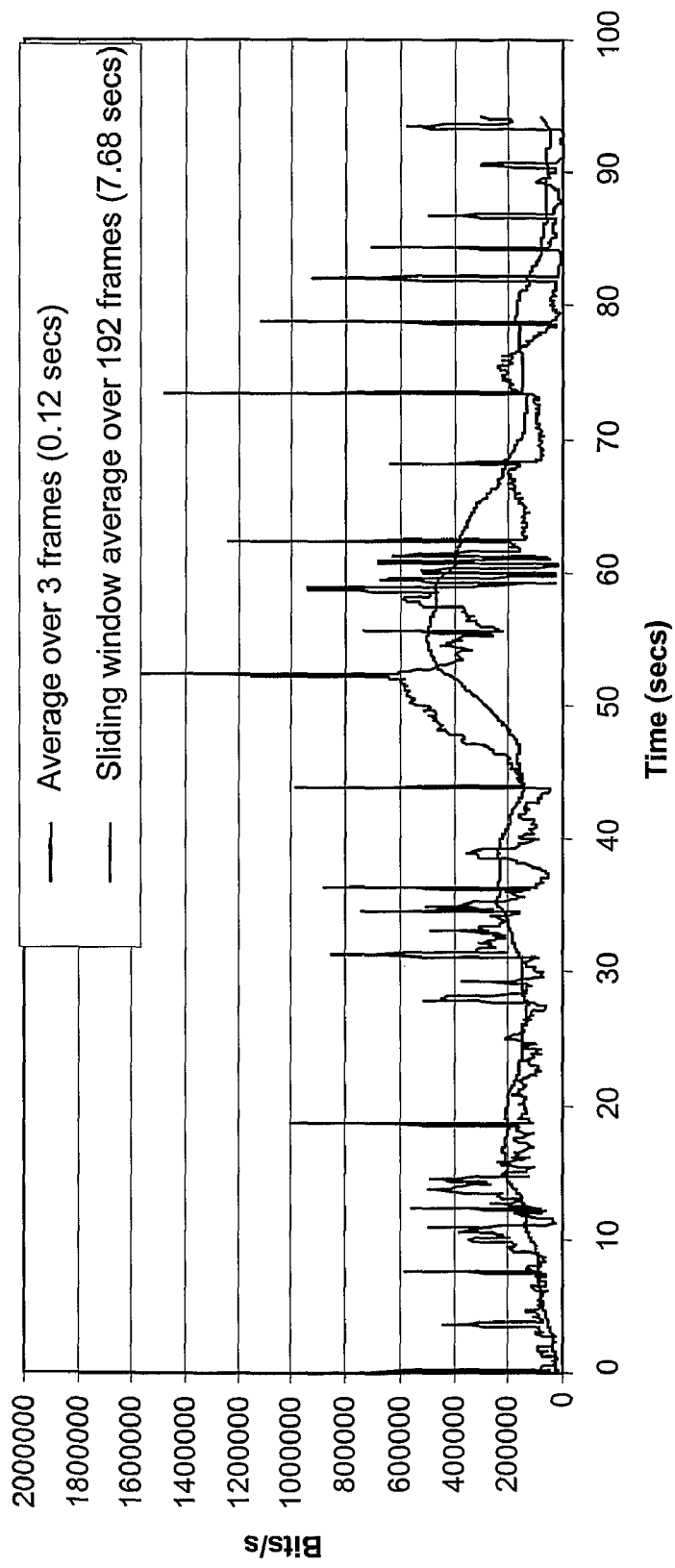
FIG. 1 is a graph showing the variation in bitrates used to encode a video sequence at a constant quality.

It is proposed that video streams transmitted over a contended piece of network are encoded at a constant quality rather than at a constant bitrate. If a video sequence is encoded at constant quality, then the bitrate used is likely to vary dramatically. FIG. 1 shows the bitrate over a 90 second video clip encoded at a constant quality level. In this example, the quality level has been determined by setting a quantiser parameter (qp) to 28. The quantiser parameter effectively controls the quality of the encoding—the smaller the quantiser, the better the quality. This clip is typical of many video sequences, with the bitrate varying depending on how complex the scene is at any given moment in time. For example, a sequence of frames where there is much movement or action usually requires a higher bitrate to encode at the same fixed quality.

The two different traces in FIG. 1 are for two different amounts of buffering. The more dynamic trace is where the bitrate is the average used over 3 frames, whereas the smoother trace is where a sliding window of 192 frames has been used. Thus, by increasing the amount of buffering, the bitrate is effectively smoothed.

The bitrate for any practical streaming system will vary considerably as a function of the difficulty of encoding the specific sequence of content as described above. This variation is even more apparent when comparing different genres of video clips. For example, sports clips might require a higher average bitrate and fluctuate more due to the high activity of typical scenes, whereas a news report clip might require a much lower bitrate and be relatively static.

As such, to deliver video streams at a constant quality to users sharing a contended network, a constant bandwidth method is not efficient to use across all the streams. The bandwidth allocated to each stream must be allowed to dynamically vary in time in accordance with the precise demands of the video being streamed at that time and also be within any network bandwidth constraints.

Figure 2:
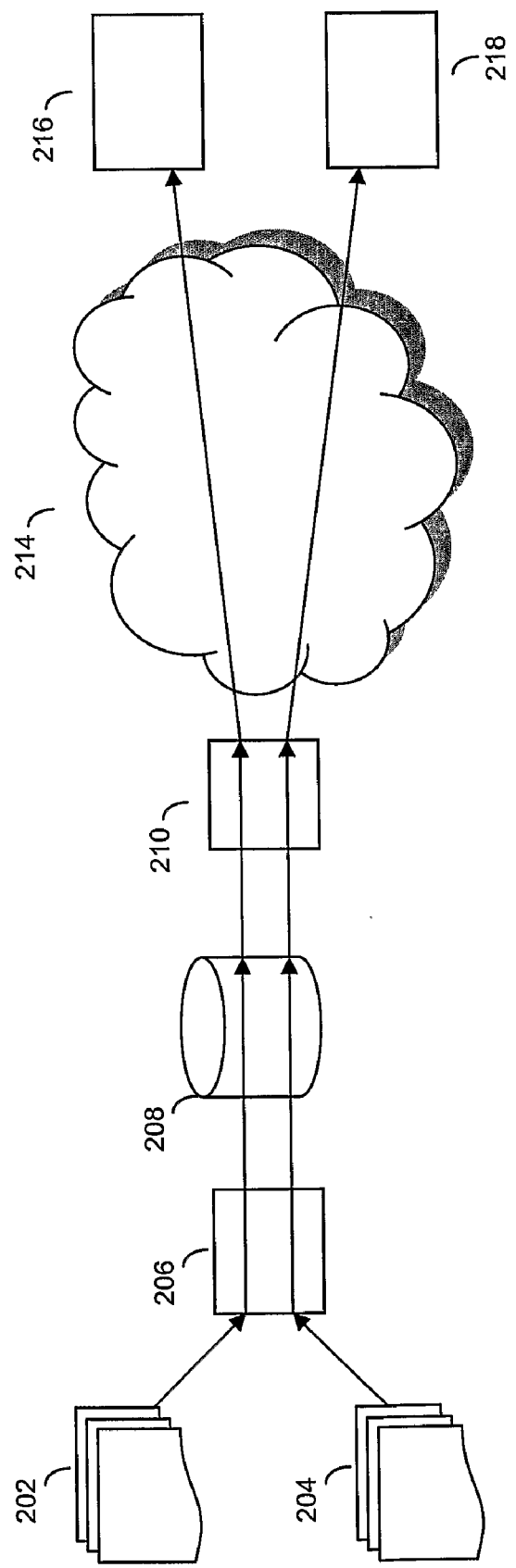
FIG. 2 is a network diagram on a system in an embodiment of the present invention.

FIG. 2 shows an example of a system 200 comprising a video encoder 206 connected to a video store 208, which is in turn connected to a server 210. The server 210 can communicate with each of two receivers, receiver_A 216 and receiver_B 218, over the IP network 214. The receivers 216 and 218 can make requests to the server 210 for video clips. The IP network 214 operates under a modified TCP arrangement which is described below in an embodiment of the present invention.

The encoder 206 encodes video sequences for transmission to the receivers 216 and 218. Here two video sequences are shown, sequence_A 202 and sequence_B 204. The encoder 206 can encode at various bitrates and outputs the encoded video sequences to the data store 208 or directly to the server 210. The data store 208 is used to store encoded video sequences until they requested or needed by the server 210. The server 210 retrieves the encoded video sequences from the data store 208 or directly from the encoder 206, and transmits them as video streams over the IP network 214 to either of the two receivers 216 and 218. Sequence_A 202 is requested and will be transmitted (after encoding) to receiver_A 216, and sequence_B 204 is requested and will be transmitted to receiver_B 218. The receivers may be suitably configured computers or set top boxes for example, and are adapted to decode the received video stream and decode the encoded sequences into the original video for viewing by a user.

When congestion occurs in the IP network 214, it is handled using a modified TCP mechanism. In embodiments of the present invention, the standard TCP protocol is modified to handle the congestion. Specifically, the dynamics of the congestion control algorithm built into TCP is modified so that the fraction of bandwidth that is allocated to any video stream over the IP network 214 at a given point in time is a function of the bandwidth requirements of that content. Thus more complex video sequences, such as sports sequences, should be given more bandwidth than less complex sequences such as news report clips. At the same time, the video streams transmitted over the IP network 214 are modified so that they are transmitted at the maximum bitrate allowed by the congestion control mechanism.

Currently under TCP, congestion control is effected uses a sliding window mechanism. The length of the sliding window determines how much data is sent before requiring an acknowledgement. The bitrate is a function of the size of this window as well as the round trip time (time between sending data and an acknowledgement being received). To ensure that more complex video sequences gets a larger share of the bandwidth, the dynamics of the congestion control algorithm are altered such that the more difficult or complex content has a larger sliding window. In effect, the 'greediness' of TCP is modified.

A number of methods can be used to alter the 'greediness' of TCP. One method is by modifying the backoff factor. Normally, TCP will halve the size of the sliding window (the backoff factor) associated with the stream in question when congestion occurs (it is assumed that packet loss is caused by congestion). In one embodiment of the present invention, we can adjust this backoff factor, so that the window size is set to, for example, three quarters of its original size when congestion is detected. The effect would be that the affected stream will be 'greedier' than normal and secure a larger bandwidth compared to if the back-off factor was half. The stream being transmitted can then be encoded at the reduced rate to utilise the whole of the bandwidth available to the stream.

The method will now be described in more detail with reference to the system 200 of FIG. 2.

The encoder 206 is provided with two different video sequences, sequence_A 202 and sequence_B 204. Each video sequence represents a different video clip. In this example, sequence_A 202 is of a sports clip such as a football match, and sequence_A is a news report clip. Both sequence_A 202 and sequence_A are fed into video encoder 206. The video encoder 206 takes each video sequence and encodes it. The encoding used is MEPG-4 AVC, but could be any other suitably configured video codec.

Each video sequence is split into segments of a predetermined duration and encoded at 3 different reference qualities. The quality can be varied by adjusting the quantiser parameter to change the encoding quality. However, other tools can be utilised, such as perceptual quality tools that give a measure of the actual perceptual quality of a sequence as perceived by a user.

Of course, fewer or more encoded sequences may be generated corresponding to fewer or more quality levels. In this example, there are three encoded sequences, each encoded at a different quality level, and each comprising four encoded segments. This is shown in more detail in FIG. 3.

FIG. 3 shows video sequence_A 202 encoded into three separate encoded video sequences: encoded video sequence_A1 300, sequence_A2 310 and sequence_A3 320. Encoded video sequence_A1 302 is encoded at a first and highest quality. Encoded video sequence_A2 310 is encoded at a second, medium quality. Encoded video sequences_A3 320 is encoded at a third and lowest quality.

Each of the encoded video sequences 300, 310 and 320 are divided into four individual segments, where the start of each segment corresponds to the same point in the un-encoded video sequence_A 202. Thus, the start of segment A1_2 304 corresponds to the start of segment A2_2 314 and also A3_2 324, but where the segments are encoded at different quality levels.

As shown in FIG. 1, the bit rate required to encode a particular video sequence at a fixed quality level will vary over time depending on what is happening in the sequence. As a result, a fixed bitrate is used for the duration of the segment, but can change from one segment to the next in the same sequence. Thus, for sequence_A1 300, the bitrate for segment A1_1 302 may differ from the bit rate for A1_2 304.

Also shown in FIG. 3 are the encoded sequences of video sequence_B 204 comprising encoded sequence_B1 330, sequence_B2 340 and sequence_B3 350. The three encoded sequences are each encoded at the same quality levels used for sequence_A 202. Thus, sequence_B1 330 is encoded at the same highest quality level as sequence_A1 300. Sequence_B2 340 is encoded at the same medium quality level as sequence_A2 310. Sequence_B3 350 is encoded at the same low quality level as sequence_A3 320.

As for the encoded sequences corresponding to sequence_A 202, each of the sequences corresponding to sequence_B 204 are also divided into segments, where each segment is encoded at a constant bitrate dependent on the content of the corresponding portion of the input video sequence at that time, but each segment may vary in bitrate when compared to the next segment in any given sequence.

Thus, the encoder generates encoded video sequences at three reference quality levels for both the video streams (to give six encoded streams), which are then sent to the data store 208. The data store 208 stores until they are needed.

The server 210 now receives a request from the receiver_A 216 for the video sequence_A 202, and also a request from receiver_B 218 for the video sequence_B 204. The server 210 retrieves the corresponding encoded video sequences from the data store 208. Alternatively, the encoded sequences may be generated dynamically by the encoder 206 and sent directly to the server 210.

Initially, the server 210 uses the lowest quality encoded sequences, sequence_A3 320 and sequence_B3 350. The server 210 can use any of the other sequences as well, depending on what bandwidth the server 210 thinks the IP network 214 has available. If the network 214 handles these streams comfortably and indicates that there is further bandwidth available, perhaps by advertising a buffer overflow in the buffers of the receivers (which might also indicate that the receiver is not capable of consuming the data quickly enough), then the server 210 switches both encoded sequences over to the next highest quality sequence (at a segment boundary to ensure continuity of the video sequence).

When the IP network 214 becomes congested, the bandwidth made available to the server 210 for streaming the encoded video sequences must be reduced. In an embodiment of the invention, the TCP mechanism is modified so that the back-off factor is adjusted so that the bandwidth made available to each of the streams is a fraction of the bandwidth corresponding to the actual bitrate of the sequence/segment being transmitted at that time.

Now that the bandwidth has been reduced for both streams, the server 210 determines which of the other quality level sequences to drop down to that can be handled by the now congested network, and crucially, also falls within the new bandwidth limitations set to each stream by the network. The server 210 effectively selects the highest quality sequence that can be delivered within the restrictions made to the bandwidth by TCP. However, by giving the sequence using a higher bitrate a higher bandwidth when congestion occurred compared with the sequence using a lower bitrate, both sequences should be able to drop down to the same quality level sequence given the constraints.

The bandwidth restriction can be made by adjusting some 'greediness' parameter for each stream being transmitted, such as the back-off factor described above. The goal is to provide each stream with a fraction of the original bandwidth that is proportional to the bitrate of the segment (at whatever quality level was being used) at the time when congestion occurred.

The result is that the system provides equitable quality video streaming across multiple video sequences, so that each video sequence is encoded at an equal quality level to every other stream, even when experiencing congestion.

When the network is being fully utilised, the sum of the bitrates of the segments being delivered at any point in time (e.g. A1_2 and B1_2 when both streams are at highest quality, perhaps when there is no congestion, or A2_4 and B2_4 when both streams are at medium quality, perhaps when slight congestion occurs) will be equal to the network capacity. By altering the TCP dynamics to ensure that each stream gets a proportion of the bandwidth that it needs for a given quality, then the segments being delivered at any moment in time will all be of similar quality, even though they may require very different bandwidths.

There are a number of factors that could confound this algorithm. One is that the different streams could have different round trip times. Even with the standard TCP algorithm, those streams with longer round trip times will get a lower fraction of the bandwidth. Applying the examples above, those streams will deliver lower quality than those with shorter round trip times. However, this can be handled by adjusting the back-off factor in accordance with the round trip time, since the round trip time is known to the sending server.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of controlling the transmission of video clips over a communications network, said method comprising the steps of:
   i) transmitting over a communications network a first encoded video sequence corresponding to a first video clip and a second encoded video sequence corresponding to a second video clip, wherein the first encoded video sequence is encoded with a first bitrate and the second encoded video sequence is encoded with a second bitrate, and wherein both the first and the second encoded video sequences are encoded at a similar first quality level;
   ii) controlling the bandwidth allocated to the first and the second encoded video sequences in the network by modifying a congestion control algorithm in the network so that a first bandwidth allocated to the first encoded video sequence is proportional to the first bitrate, and a second bandwidth allocated to the second encoded video sequence is proportional to the second bitrate; and in response to network congestion,
   iii) transmitting over the communications network a further first encoded video sequence encoded at and a further second encoded video sequence, the first encoded video sequence encoded with a further first bitrate and the second encoded video sequence is encoded with a further second bitrate wherein both the further first and the further second encoded video sequences are encoded at a similar second quality level; and
   iv) controlling the bandwidth allocated to the further first and the further second encoded video sequences in the network by modifying a congestion control algorithm in the network so that the first bandwidth allocated to the further first encoded video sequence is proportional to the further first bitrate, and a second bandwidth allocated to the second encoded video sequence is proportional to the further second bitrate.

2. A method according to claim 1, wherein the communications network is a packet based network.

3. A method according to claim 1, wherein the communications network is an Internet protocol network.

4. A method according to claim 1, wherein the communications network implements the transmission control protocol.

5. A method according to claim 4, wherein the modifying of a congestion control algorithm comprises adjusting the backoff parameter in the transmission control protocol.

6. A method according to claim 4, wherein encoding comprises compression.

7. A method according to claim 6, wherein the encoding is MPEG-4 encoding.

8. A system for controlling the transmission of video cups over a communications network, said system comprising:
   i) a server adapted to transmit over a communications network a 20 first encoded video sequence corresponding to a first video clip and a second encoded video sequence corresponding to a second video clip, wherein the first encoded video sequence is encoded with a first bitrate and the second encoded video sequence is encoded with a second bitrate, and wherein both the first and the second encoded video sequences are encoded at a similar first quality level; and
   ii) means for controlling the bandwidth allocated to the first and the second encoded video sequences in the network by modifying a congestion control algorithm in the network so that a first bandwidth allocated to the first encoded video sequence is proportional to the first bitrate and a second bandwidth allocated to the second encoded video sequence is proportional to the second bitrate, and wherein the server is adapted to respond to network congestion by:
   transmitting over the communications network a further first encoded video sequence encoded at and a further second encoded video sequence, the first encoded video sequence encoded with a further first bitrate and the second encoded video sequence is encoded with a further second bitrate wherein both the further first and the further second encoded video sequences are encoded at a similar second quality level; and
   controlling the bandwidth allocated to the further first and the further second encoded video sequences in the network by modifying a congestion control algorithm in the network so that the first bandwidth allocated to the further first encoded video sequence is proportional to the further first bitrate, and a second bandwidth allocated to the second encoded video sequence is proportional to the further second bitrate.

* * * * *